US 8,542,749 B2

(12) United States Patent
Bush

(10) Patent No.: US 8,542,749 B2
(45) Date of Patent: Sep. 24, 2013

(54) METHOD AND APPARATUS FOR MEASURING AUDIOVISUAL SYNCHRONISATION

(75) Inventor: Sally Bush, Alresford Hampshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 127 days.

(21) Appl. No.: 13/140,681

(22) PCT Filed: Dec. 17, 2008

(86) PCT No.: PCT/EP2008/067791
§ 371 (c)(1),
(2), (4) Date: Jun. 17, 2011

(87) PCT Pub. No.: WO2010/069375
PCT Pub. Date: Jun. 24, 2010

(65) Prior Publication Data
US 2012/0057031 A1     Mar. 8, 2012

(51) Int. Cl.
*H04N 17/00* (2006.01)
*H04N 7/26* (2006.01)
(52) U.S. Cl.
USPC ..................... 375/240.28; 348/194
(58) Field of Classification Search
USPC .......... 348/515, 192, 194, 180, 14.12, 14.13; 375/240.28; 714/712, 715, 776, 820, 821, 714/744; 386/201
See application file for complete search history.

(56) References Cited

U.S. PATENT DOCUMENTS

| 6,366,314 | B1 * | 4/2002 | Goudezeune et al. | ........ 348/192 |
| 6,598,172 | B1 * | 7/2003 | VanDeusen et al. | .......... 713/503 |
| 6,618,077 | B1 * | 9/2003 | Baina et al. | ................... 348/192 |
| 6,744,815 | B1 * | 6/2004 | Sackstein et al. | ............. 375/240 |
| 6,754,241 | B1 * | 6/2004 | Krishnamurthy et al. | .... 370/537 |
| 6,842,485 | B2 * | 1/2005 | Monda et al. | ............. 375/240.25 |
| 6,880,115 | B2 * | 4/2005 | Abraham et al. | ............. 714/712 |
| 7,154,533 | B2 * | 12/2006 | Sheldon et al. | ............... 348/192 |
| 7,230,987 | B2 * | 6/2007 | Demas et al. | ............. 375/240.28 |
| 7,605,843 | B2 * | 10/2009 | Hamada et al. | ............... 348/192 |

(Continued)

FOREIGN PATENT DOCUMENTS

| EP | 1 259 082 | 11/2002 |
| GB | 2 341 758 | 3/2000 |

OTHER PUBLICATIONS

International Search Report for PCT/EP2008/067791, mailed Jul. 13, 2009.

(Continued)

*Primary Examiner* — Victor Kostak
(74) *Attorney, Agent, or Firm* — Nixon & Vanderhye P.C.

(57) ABSTRACT

There is provided a method of measuring audiovisual synchronization between at least one encoded audio stream and at least one encoded video stream, comprising measuring the time of input into an audio encoder of source audio data to be encoded into said encoded audio stream, measuring the time of input into a video encoder of source video data to be encoded into said encoded video stream, determining a Presentation Time Stamp value, indicative of a time of presentation, for each of the respective at least one encoded audio stream and at least one encoded video stream, and transmitting a measured audio input time, a measured video input time and presentation time stamp values to a downstream component. There is also provided an apparatus and system for measuring audiovisual synchronization between at least one encoded audio stream and at least one encoded video stream.

22 Claims, 3 Drawing Sheets

(56) References Cited

U.S. PATENT DOCUMENTS

| | | |
|---|---|---|
| 2001/0001023 A1 | 5/2001 | Imahashi et al. |
| 2002/0035732 A1 | 3/2002 | Zetts |
| 2005/0105626 A1* | 5/2005 | Douniwa .................. 375/240.28 |
| 2006/0098742 A1* | 5/2006 | Meenakshisundaram et al. ........................ 375/240.27 |
| 2006/0140280 A1* | 6/2006 | Okada et al. ............. 375/240.28 |

OTHER PUBLICATIONS

Linear Acoustic: "Audio and Video synchronization", [Online], (2004), 8 pages.

* cited by examiner

METHOD AND APPARATUS FOR MEASURING AUDIOVISUAL SYNCHRONISATION

This application is the U.S. national phase of International Application No. PCT/EP2008/067791, filed 17 Dec. 2008, which designated the U.S., the entire content of which is hereby incorporated by reference.

TECHNICAL FIELD

The invention is related to digital video encoding and decoding in general, and in particular to a method and apparatus for measuring audiovisual synchronisation.

BACKGROUND

Audiovisual data, for example broadcast television or on demand movies, is extremely large in size. Hence, methods of digitally compressing audiovisual data have been developed, for example Motion Picture Experts Group (MPEG)-2 and MPEG-4 Part 10/H.264.

A basic compression system 100, as deployed in broadcast television, consists of an encoder (compressor) and a decoder (de-compressor) as illustrated by FIG. 1.

In FIG. 1, the video to be encoded is inputted into a video encoder 110, which produces an elementary stream of digitally compressed video data 130. The encoder includes a Presentation Time Stamp (PTS) insertion unit 115, which inserts PTS's into the video elementary stream, according to the requirements of the digital video encoding standard in use with the system 100 (e.g. MPEG-4).

Meanwhile, the audio corresponding to the video is inputted into an audio encoder 120, again having a PTS insertion unit 125, to produce an elementary stream of digitally compressed audio data 135.

A multiplexing unit 140 multiplexes the video and audio elementary streams together to form a Transport Stream 145, ready for transmission to a receiver 155 through a network 150 or stored on a storage device for later transmission.

A typical receiver 155 will comprise the units required to carry out the reverse process of decoding. In particular, there is a de-multiplexer 160, which provides the de-multiplexed elementary streams to the video decoder 170 and audio decoder 180 respectively. To enable the PTS values to be used, a PTS detection unit (175/185) is generally included in each audio or video decoder.

The bit stream 145 out of the multiplexer 140 may be stored at several stages within the network 150 and/or may also be re-multiplexed several times with other audiovisual data streams.

The inputs to an encoder (110, 120) are generally uncompressed audio or video data, and corresponding pairs of audio and video encoders (110, 120), operating on the same source audiovisual material, are expected to have source material that is correctly synchronized at source.

However, for various reasons, it is possible for these inputs to arrive at their respective encoder with relative delays, so that the audio and video of a corresponding pair of encoders are not always correctly synchronized.

Furthermore the encoding systems themselves introduce delays which are not necessarily the same for both the video and audio, because the audio and video are separated during both the encode and the decode processes (as shown in FIG. 1).

Moreover, the decoder and encoder are also geographically separated. This separation may lead to the audio and video no longer being aligned when they reach the viewer, despite their arrival at the respective encoders in adequately synchronized form.

Ideally the encoder system would be able at least to detect this mis-alignment, measure its value and then correct it, but no industry agreed method exists for this and the various manufacturers of compression systems and their customers who operate them use a variety of means to deal with the problem of audiovisual synchronisation—from doing nothing, to regular system calibration. Nevertheless, no fully satisfactory method currently exists to assure operators of correct audiovisual alignment at all times.

One simplistic way to check the alignment of audio and video at the output of a compression system is to use a known pair of video and audio signals. One example of such a scheme is to use a "flash" and "beep" signal, which is a derivative of the well known method used in the film industry of a clapper board that links a given film frame with a well defined sound.

Such a scheme is described in British Patent 2,341,758 A. The marking of a given video frame with a flash and simultaneously the audio with a short "beep" enables a measure of how far apart the audio and video are at the output of a test decoder.

However, this is clearly an inconvenient method as it has to be done off-line (i.e. whilst the system is not broadcasting to users) either manually, or using a PC package that automates this process.

There are several audiovisual (AV) synchronization software measurement packages available, but these still rely on decoding the compressed audio and video before measuring the audiovisual synchronization and the decoding step itself may affect the result. These methods only measure the relative synchronization, which clearly requires manual intervention to perform the measurement and then take any remedial steps to correct any defect.

One key issue is to establish whether the audio and video are misaligned during the encoding processes themselves, for example due to a lack of calibration of the respective encoders, or whether the misalignment is due to mis-aligned signals arriving at the encoders. Whilst the former can be corrected by proper calibration of the encoders under test, the latter cannot be corrected without an escalation of the measurement to the preceding transmission system.

To be able to check the audiovisual synchronization at the output of an encoder, a decoder is required, but a decoder (hardware or software) will also separate the audio and video components and may introduce its own audiovisual synchronization error. This means that the overall system audiovisual synchronization is being measured, and not that of just an encoder, and it is impossible to isolate how much of the audiovisual synchronization error is due to the encode process, or the decoder. Accordingly, it would be desirable to have a method and apparatus for testing audiovisual synchronisation that can measure the delay of the encoder only, and which works whilst the broadcast/transmission system is online (i.e. operating to provide audiovisual data to end viewers).

Furthermore, once compressed, the data stream from the encoder system typically uses the MPEG-2 Transport Stream standard (ISO/IEC 13818-1: Information technology—Generic coding of moving pictures and associated audio information: Systems) to convey the combined compressed audio and video data, as well as other related signals, to the decoder. This MPEG-2 Transport Stream standard is also used in more recent video encoding standards, such as H.264.

Accordingly, it would also be desirable to have a method of estimating the state of audiovisual synchronization within a Transport Stream, because it would negate the need to use a separate offline physical or PC based decoder during measurement.

SUMMARY

Embodiments of the present invention provide a method of measuring audiovisual synchronisation between at least one encoded audio stream and at least one encoded video stream, comprising measuring the time of input into an audio encoder of source audio data to be encoded into said encoded audio stream, measuring the time of input into a video encoder of source video data to be encoded into said encoded video stream, determining a Presentation Time Stamp value, indicative of a time of presentation, for each of the respective at least one encoded audio stream and at least one encoded video stream, and transmitting a measured audio input time, a measured video input time and presentation time stamp values to a downstream component.

Optionally, instead of transmitting the measured audio and video input times, the method further comprises calculating a difference between the time of presentation and the measured time of input for each of the at least one encoded audio stream and at least one encoded video stream, determining an audiovisual synchronisation value from the calculated difference.

Optionally, the step of determining an audiovisual synchronisation value comprises subtracting the calculated difference between the time of presentation and the measured time of input for the encoded audio stream from the calculated difference between the time of presentation and the measured time of input for the encoded video stream.

Optionally, the time of input into an audio encoder of source audio data to be encoded into said encoded audio stream and the time of input into a video encoder of source video data to be encoded into said encoded video stream are measured using a clock also used to produce the Presentation Time Stamp value.

Optionally, the clock is the encoder system clock.

Optionally, the Presentation Time Stamp value is determined according to a digital compression standard(s) in use to compress the encoded audio stream and encoded video stream.

Optionally, the measured audio input time and the measured video input time, or the audiovisual synchronisation value is inserted into a transport stream containing the encoded audio stream and encoded video stream, for use by downstream components in determining the delay of an upstream audio and video encoder pair.

Optionally, the downstream components display said measured audio input time and the measured video input time, or said audiovisual synchronisation value.

Optionally, the downstream components use said audiovisual synchronisation value to automatically re-align the encoded audio stream and the encoded video stream.

Optionally, at least one encoded audio stream and at least one encoded video stream comprises a corresponding audiovisual pair to be presented in synchronisation.

Embodiments of the present invention also provide an apparatus for measuring audiovisual synchronisation between at least one encoded audio stream and at least one encoded video stream, comprising a delay calculation unit, adapted to measure audiovisual synchronisation according to any of the above audiovisual synchronisation measurement method, and a private data encoder adapted to encode data indicative of the measured audiovisual synchronisation into a transport stream.

Optionally, the apparatus is an audiovisual encoder. However, it may form any part of the overall audiovisual broadcast/transmission system in use.

Embodiments also provide a system for measuring audiovisual synchronisation between at least one encoded audio stream and at least one encoded video stream and outputting a measured audiovisual synchronisation value, comprising an encoder apparatus adapted according to the above methods, and a decoder apparatus comprising a private data decoder adapted to decode private data in a audiovisual transport stream containing said data indicative of the measured audiovisual synchronisation.

BRIEF DESCRIPTION OF THE DRAWINGS

A method and apparatus for measuring audiovisual synchronisation will now be described, by way of example only, with reference to the accompanying drawings in which.

DETAILED DESCRIPTION

Figure 1:
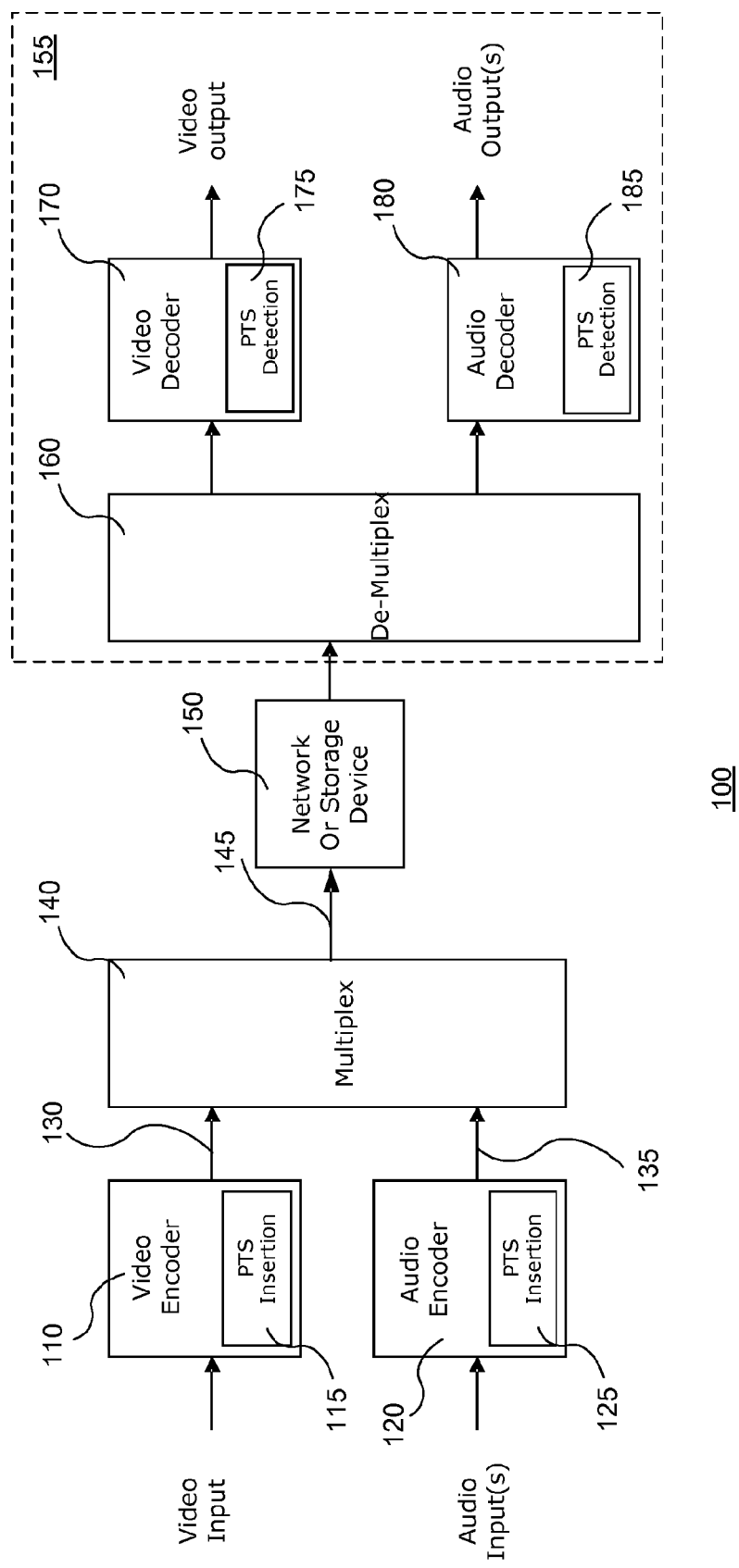
FIG. 1 shows a block schematic diagram of a prior art MPEG coding and transport stream system.

Embodiments of the invention will now be described with reference to the accompanying drawings in which the same or similar parts or steps have been given the same or similar reference numerals.

The aim of this invention is to measure the audiovisual synchronization value at the output of an encoder without decoding the compressed data.

It is possible to calculate the overall audiovisual synchronization value as follows:

audiovisual synchronization value=total audio delay−total video delay.

Where:

total audio delay=audio presentation time−audio input time; and total video delay=video presentation time−video input time.

The audio input time is the time of input into an audio encoder of source audio data to be encoded. Similarly, the video input time is the time of input into a video encoder of source video data to be encoded.

The time at which both the audio and video enter the encoder can be obtained at the start of the encode process by using the encoder system clock as a reference.

Because the two encoding processes are separate before their output data streams are combined, compression standards generally provide for the encoder to calculate the time at which both the video and audio should be presented to the viewer by the decoder. This presentation information is carried as an essential part of the MPEG-2/4 standards, and takes the form of Presentation Time Stamps (PTS) that are present in both the audio and video streams. This is the reason for having PTS insertion units 115 and 125 at the encoder side of the system, and PTS detection units 175 and 185 at the decoder side.

The audio and video presentation time in the above calculations are derived from the respective Presentation Time Stamp.

Since compression standards are open standards to which any manufacturer may make equipment, and there is an assumption that all implementations of a digital compression standard will be interoperable (the whole reason for a standard), any decoder is assumed to be compliant with MPEG-2/4 systems requirements. The presence and use of PTS stamps in particular is often further enforced by virtue of system designers making necessary internal timing adjustments using the PTS.

Therefore the time the video and audio should be presented to the viewer are known through the Presentation Time Stamps, and should be correct regardless of any differences in encoding or decoding equipment used. Should the time at which the video and audio data enter the broadcast chain also be known (by using a system clock), then it is possible to continuously calculate the respective encoder/decoder coding delays.

To enable the delay information to be disseminated to downstream systems, these resultant calculated delays can be carried in the private data sections of the MPEG-2 Transport Stream standard. This downstream dissemination makes the delay data 275 available for any purpose in the transmission chain or specifically at the decoder.

Alternatively, in some embodiments, only the audio input time and video input times are sent together with the Presentation Time Stamps. This is because it is possible the PTS may get altered by some other piece of equipment in the broadcast chain (i.e. multiplexers) and if the delay calculation is not left to downstream equipment to carry out, it may be inaccurate. Further embodiments may send both the measured audio and video input time data, and audiovisual synchronisation data.

Put another way, by sending the raw input time data from which the delay can be calculated, instead of the calculated delay itself, suitably modified downstream equipment may make their own delay calculations from the PTS values currently in use. This is useful in the cases where the PTS values are altered by the transmission equipment as the audiovisual data is transmitted, or where the downstream equipment needs to calculate its own delay.

The output stream from an encoder according to an embodiment of the invention can thus be monitored and/or recorded and can be analyzed on- or off-line to find the audio and video input times and PTS values, from which the audiovisual synchronization value can be calculated. Alternatively, the audiovisual synchronisation value may be provided in the Transport Stream directly.

The transmitted measured delay values/raw input time data can be then be used by suitably enabled downstream equipment to adjust the audio and video alignment automatically (assuming that other requirements are not broken) or they can be displayed to an engineer who can track delays in real-time and/or make manual adjustments.

As mentioned previously, the MPEG compression standard requires a system clock reference which is distributed within a compliant encoder. By recording this system clock value regularly when the video and audio data arrives, an exact measure of the time the respective source materials enter the encoding process can be known and recorded.

This clock reference value is then also used to calculate the presentation time stamp (PTS) for both the audio and video components. The calculation of the PTS is done within the encoder 110/120, and is used to synchronize the components in an MPEG-2 transport stream. The respective PTS value is the time at which the audio or video data is to be presented to the viewer.

The encoder 110/120 measures the actual input time and the required play-out time for each component, and hence the required delays can be calculated:

$$\text{Audio delay} = \text{time presented} - \text{time in}$$

$$\text{Video delay} = \text{time presented} - \text{time in}$$

This delay information or audio/video input times, may then be included in the MPEG-2 Transport Stream(s) in various ways:

1) As private data in a portion of the MPEG-2 Transport Stream reserved for carrying private data transmissions.

2) As private data in the part of the MPEG-2 transport stream known as the Packetized Elementary Stream.

3) As private data in the elementary stream itself.

Option 1 is the preferred method of incorporating delay data into the Transport Stream. However, each option utilises a similar form of data insertion, albeit at a different logical level within the Transport Stream. If a secure method of sending the delay data is required, it may be encoded into the audiovisual data itself.

Figure 2:
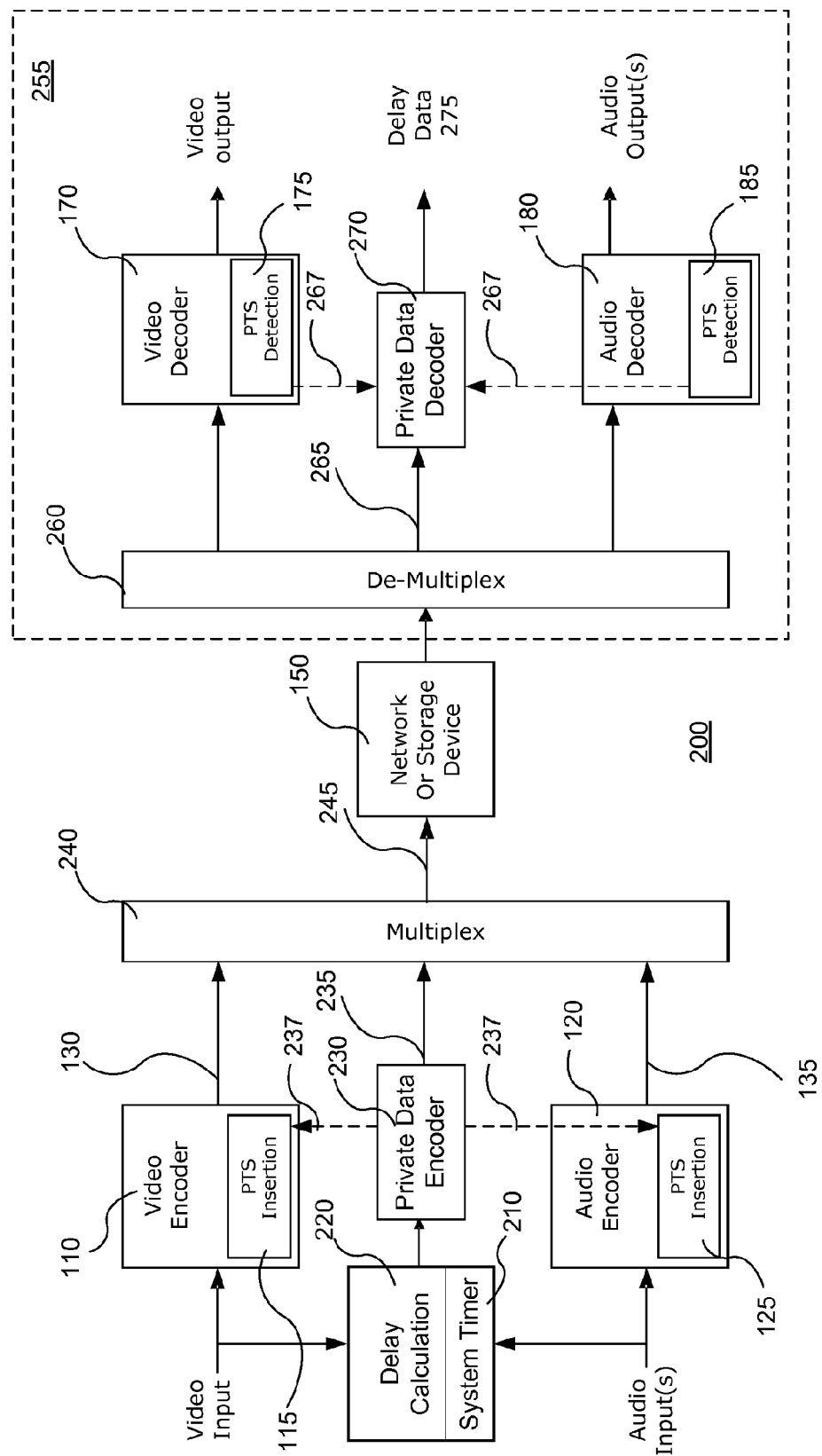
FIG. 2 shows a block schematic diagram of a MPEG coding and transport stream system according to an embodiment of the present invention.

FIG. 2 shows an embodiment of the present invention, where the overall system is much the same as that shown in FIG. 1. However, the encoding side of FIG. 2 also includes a delay calculation unit 220, which uses the system clock/timer 210 to measure the audio and video input times or calculate the encoder system delay as described in more detail above.

The delay calculation unit 220 provides the audio and video input times and/or delay data to a Private Data Encoder 230, which may provide the encoded delay data to the PTS insertion unit 237, to insert in a similar way to the PTS data, or it may provide the data directly to the multiplexer 140 (235) to be inserted/multiplexed into the Transport Stream in one of the other methods mentioned above.

In some implementations, the Private data encoder 230 may receive PTS data from the PTS insertion unit 115/125, for passing back to the delay calculation unit 220 (hence path 237 is bi-directional, and in dotted lines) for use in calculating the delay.

The multiplexer 240 therefore outputs a transport stream 245 with delay data embedded within it, for transmission over the network, or for storage in a storage device 150, both as per the prior art.

As mentioned previously, depending on whether downstream equipment will alter the PTS values or not, the delay data may take the form of the calculated delay or simply the raw input data and PTS value data from which the delay can be calculated.

Typically, the delay data is inserted into the transport stream within the same transport stream frame as the PTS to which the delay data relates. Hence, if used, the delay calculation is carried out in a very short time. However, since it is not a highly complex and convoluted calculation, there is sufficient time to do so. For the case where only the measured audio and video input times are sent, there is no calculation delay anyway.

At the receiver 255 side, the decoding system now incorporates a private data decoder unit 270 which takes the de-multiplexed encoded delay data 265, or the delay data encoded into the respective audio or video streams and which is extracted by the PTS detection unit 267 (if this form of delay data insertion is used), and decodes the delay data 275 ready for display at the decoding side, or for use in controlling a suitable form of automatic audiovisual synchronisation. Where only the measured audio and video input times are sent across, the delay calculation may be carried out at this point instead.

Figure 3:
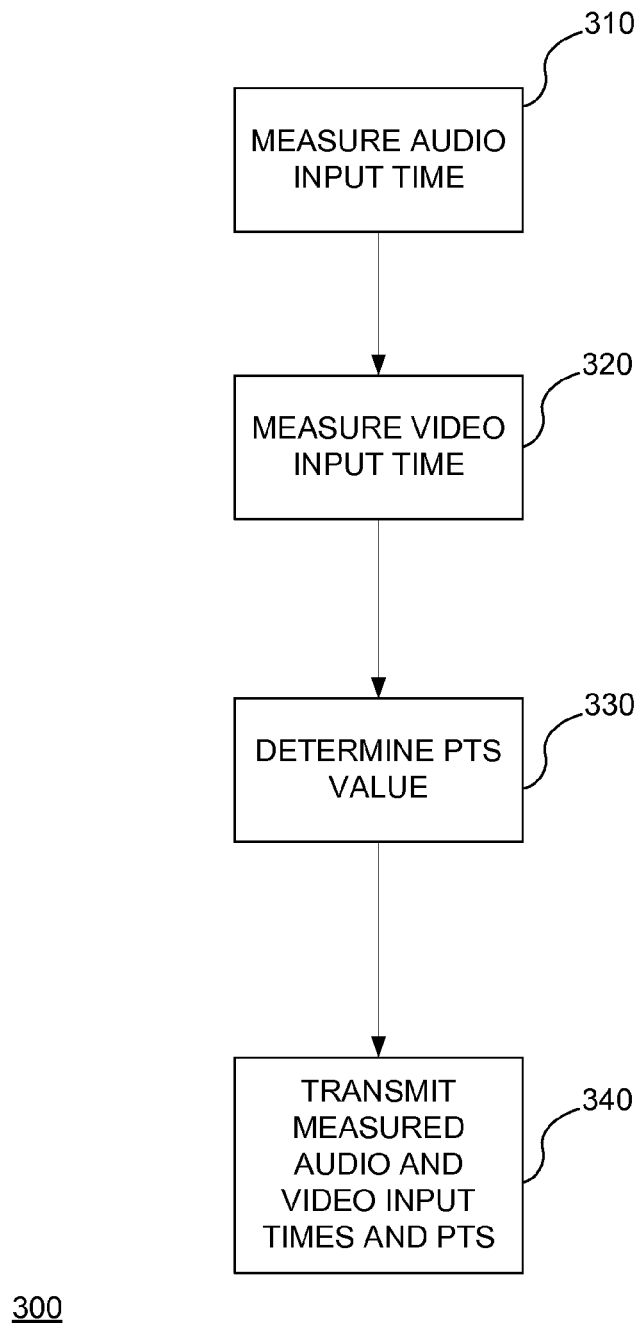
FIG. 3 shows a flow diagram of a method for measuring audiovisual synchronisation according to an embodiment of the present invention.

FIG. 3 shows the method for measuring audiovisual synchronisation 300 according to an embodiment of the present invention where the measured input times are sent to downstream equipment for use therein. In particular, the method 300 comprises measuring the audio input time at step 310, measuring the video input time at step 320, determining a PTS value (according to compression standards in use) at step 330 and then transmitting the measured audio and video input times together with the PTS values at step 340. In some embodiments, step 340 may instead be a delay calculation step as described in more detail above.

With the above-described method of calculating audiovisual synchronization values, the actual difference (i.e. delay) can be measured at the output of an encoder, negating the use of a separate test decoder. Thus, a specific test signal is no longer required to measure audiovisual synchronization, and the delay measurement can be used in a broadcast situation, without affecting the broadcast.

The method may be embodied as a specially programmed, or hardware designed, integrated circuit which operates to carry out the audiovisual synchronisation measurement method on data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described method, located on a daughterboard of a rack mounted video encoder, for use in, for example, a television studio or location video uplink van supporting an in-the-field news team.

Another exemplary hardware embodiment of the present invention is that of a video pre-processor made out of an Application Specific Integrated Circuit (ASIC).

It will be apparent to the skilled person that the exact order and content of the processing order in the method described herein may be altered according to the requirements of a particular set of execution parameters, such as speed of encoding, accuracy, and the like. Accordingly, the claim numbering is not to be construed as a strict limitation on the ability to move steps between claims, and as such portions of dependent claims maybe utilised freely.

The invention claimed is:

1. A method of measuring audiovisual synchronisation between at least one encoded audio strewn and at least one encoded video stream, comprising:
    measuring the time of input into an audio encoder of source audio data to be encoded into said encoded audio stream;
    measuring the time of input into a video encoder of source video data to be encoded into said encoded video stream;
    determining a Presentation Time Stamp value, indicative of a time of presentation, for each of the respective at least one encoded audio stream and at least one encoded video stream; and
    transmitting the measured audio input time, the measured video input time, and the presentation time stamp values to a downstream component.

2. The method of claim 1, wherein the time of input into an audio encoder of source audio data to be encoded into said encoded audio stream and the time of input into a video encoder of source video data to be encoded into said encoded video stream are measured using a clock also used to produce the Presentation Time Stamp value.

3. The method of claim 2, wherein the clock is the encoder system clock.

4. The method of claim 1, wherein the Presentation Time Stamp value is determined according to one or more digital compression standards in use to compress the encoded audio stream and encoded video stream.

5. The method of claim 1, wherein the measured audio input time and the measured video input time are inserted into a transport stream containing the encoded audio stream and encoded video stream, for use by downstream components in determining the delay of an upstream audio and video encoder pair.

6. The method of claim 5, wherein downstream components display said measured audio input time and the measured video input time.

7. The method of claim 1, wherein each at least one encoded audio stream and at least one encoded video stream comprises a corresponding audiovisual pair to be presented in synchronisation.

8. Apparatus for measuring audiovisual synchronisation between at least one encoded audio stream and at least one encoded video stream, comprising:
    a delay calculation unit confirmed to measure audiovisual synchronisation according to claim 1; and
    a private data encoder confirmed to encode data indicative of the measured audiovisual synchronisation into a transport stream.

9. The apparatus of claim 8, wherein the apparatus is an audiovisual encoder.

10. A system for measuring audiovisual synchronisation between at least one encoded audio stream and at least one encoded video stream and outputting a measured audiovisual synchronisation value, comprising:
    the encoder apparatus of claim 9; and
    a decoder apparatus comprising a private data decoder adapted to decode private data in a audiovisual transport stream containing said data indicative of the measured audiovisual synchronisation.

11. The method of claim 1, wherein the audiovisual synchronisation value is inserted into a transport stream containing the encoded audio stream and encoded video stream, for use by downstream components in determining the delay of an upstream audio and video encoder pair.

12. The method of claim 11, wherein downstream components display said audiovisual synchronisation value.

13. The method of claim 11, wherein downstream components use said audiovisual synchronisation value to automatically re-align the encoded audio stream and the encoded video stream.

14. A method of measuring audiovisual synchronisation between at least one encoded audio stream and at least one encoded, video stream, comprising:
    measuring the time of input into an audio encoder of source audio data to be encoded into said encoded audio stream;
    measuring the time of input into a video encoder of source video data to be encoded into said encoded video strewn;
    determining a time of presentation value for each of the respective at least one encoded audio stream and at least one encoded video stream;
    calculating a difference between the time of presentation and the measured time of input for each of the at least one encoded audio stream and at least one encoded video stream; and
    determining an audiovisual synchronisation value from the calculated difference.

15. The method of claim 14, wherein the step of determining an audiovisual synchronisation value comprises:
   subtracting the calculated difference between the time of presentation and the measured time of input for the encoded audio stream from the calculated difference between the time of presentation and the measured time of input for the encoded video stream.

16. The method of claim 14, wherein the time of input into an audio encoder of source audio data to be encoded into said encoded audio stream and the time of input into a video encoder of source video data to be encoded into said encoded video stream are measured using a clock also used to produce the time of presentation value.

17. The method of claim 16, wherein the clock is the encoder system clock.

18. The method of claim 14, wherein the time of presentation value is determined according to one or more digital compression standards in use to compress the encoded audio stream and encoded video stream.

19. The method of claim 14, wherein each at least one encoded audio stream and at least one encoded video stream comprises a corresponding audiovisual pair to be presented in synchronisation.

20. Apparatus for measuring audiovisual synchronisation between at least one encoded, audio stream and at least one encoded video stream, comprising:
   a delay calculation unit confirmed to measure audiovisual synchronisation according to claim 14; and
   a private data encoder confirmed to encode data indicative of the measured audiovisual synchronisation into a transport stream.

21. The apparatus of claim 20, wherein the apparatus is an audiovisual encoder.

22. A system for measuring audiovisual synchronisation between at least one encoded audio stream and at least one encoded video stream and outputting a measured audiovisual synchronisation value, comprising:
   the encoder apparatus of claim 21; and
   a decoder apparatus comprising a private data decoder adapted to decode private data in a audiovisual transport stream containing said data indicative of the measured audiovisual synchronisation.

* * * * *

UNITED STATES PATENT AND TRADEMARK OFFICE
CERTIFICATE OF CORRECTION

PATENT NO.         : 8,542,749 B2
APPLICATION NO.    : 13/140681
DATED              : September 24, 2013
INVENTOR(S)        : Bush Page 1 of 1

It is certified that error appears in the above-identified patent and that said Letters Patent is hereby corrected as shown below:

In the Claims

In Column 7, Line 51, in Claim 1, delete "audio strewn" and insert -- audio stream --, therefor.

In Column 8, Line 22, in Claim 8, delete "Apparatus" and insert -- An apparatus --, therefor.

In Column 8, Line 54, in Claim 14, delete "encoded, video" and insert -- encoded video --, therefor.

In Column 8, Line 58, in Claim 14, delete "strewn;" and insert -- stream; --, therefor.

In Column 10, Line 1, in Claim 20, delete "Apparatus" and insert -- An apparatus --, therefor.

In Column 10, Line 2, in Claim 20, delete "encoded, audio" and insert -- encoded audio --, therefor.

Signed and Sealed this
Fifteenth Day of July, 2014

Michelle K. Lee
*Deputy Director of the United States Patent and Trademark Office*